United States Patent [19]
Lien

[11] Patent Number: 5,644,552
[45] Date of Patent: Jul. 1, 1997

[54] LID WITH A TIMER

[75] Inventor: Chang-hsing Lien, Taipei, Taiwan

[73] Assignee: Action Overseas Co., Ltd., Taipei, Taiwan

[21] Appl. No.: 686,150

[22] Filed: Jul. 24, 1996

[51] Int. Cl.$^6$ .......................... G04B 47/00; A47J 37/12; B65D 25/28

[52] U.S. Cl. .................. 368/10; 99/342; 99/403; 220/212.5; 220/213

[58] Field of Search .................. 368/10, 97–100, 368/107–109; 99/342–344, 403; 220/212, 212.5, 213, 256

[56] References Cited

U.S. PATENT DOCUMENTS

| | | | |
|---|---|---|---|
| 578,059 | 3/1897 | Hallas | 368/100 |
| 2,192,600 | 3/1940 | Lurtz | 99/344 |
| 4,451,156 | 5/1984 | Kloppsteck | 368/10 |

Primary Examiner—Vit W. Miska
Attorney, Agent, or Firm—Holland & Hart

[57] ABSTRACT

A lid with a timer includes a circular recess defined in a substantial center of the lid. A plurality of equidistant ear portions protrude from an inner wall of the circular recess and each define a notch. A tubular cap has a circular plate with a central hole and a plurality of apertures and a downward extending edge defining a threaded periphery. A plurality of flats facing the ear portions so as to be marginally received within the circular recess. The tubular cap further defines a groove facing the notches of the ear portions, and a cylindrical chamber for receiving the timer. An adjusting pole extends through the central hole and a corresponding plurality of screws of the timer extending through the apertures. A 'C'-clip is received within the groove and biased within the notches as to secured the tubular cap onto the lid. A knob is coupled with the adjusting pole of the timer. A collar defines a circular bore with a threaded surface for engaging with the threaded periphery of the tubular cap and the knob to extend therethrough and rotatably secure therewithin.

3 Claims, 3 Drawing Sheets

LID WITH A TIMER

BACKGROUND OF THE INVENTION

The present invention relates to a lid, and particularly to an engagement structure for securing a timer onto a lid for a pot.

Pots have been a commonly-used utensil for cooking for thousands of years. However, whether the pots are used for steaming or boiling, cooks require to see a clock or a watch to estimate cooking durations. It is not convenient for a cook to use such a pot, therefore, there is a need to incorporate a timer onto a pot for indicating the cooking period of a particular food. However, most lids of pots are made from ceramic, glass, or metal material, thus, it is not easy to incorporate a timer onto a lid.

SUMMARY OF THE INVENTION

An object of the present invention is to provide a novel lid which can be easily assembled with a timer.

Another object of the present invention is to provide a lid which is easily manufactured.

The present invention provides a lid with a timer includes a circular recess defined in a substantial center of the lid. A plurality of equidistant ear portions protrude from an inner wall of the circular recess and each define a notch. A tubular cap has a circular plate with a central hole and a plurality of apertures and a downward extending edge defining a threaded periphery. A plurality of flats face the ear portions so as to be marginally received within the circular recess. The tubular cap further defines a groove facing the notches of the ear portions, and a cylindrical chamber for receiving the timer by having an adjusting pole extending through the central hole and a corresponding plurality of screws of the timer extending through the apertures. A 'C'-clip received within the groove and biased within the notches so as to secure the tubular cap onto the lid. A knob is coupled with the adjusting pole of the timer. A collar defines a circular bore with a threaded surface for engaging with the threaded periphery of the tubular cap and the knob to extend therethrough and rotatably secure therewithin.

DETAILED DESCRIPTION OF THE PREFERRED EMBODIMENTS

Figure 1:
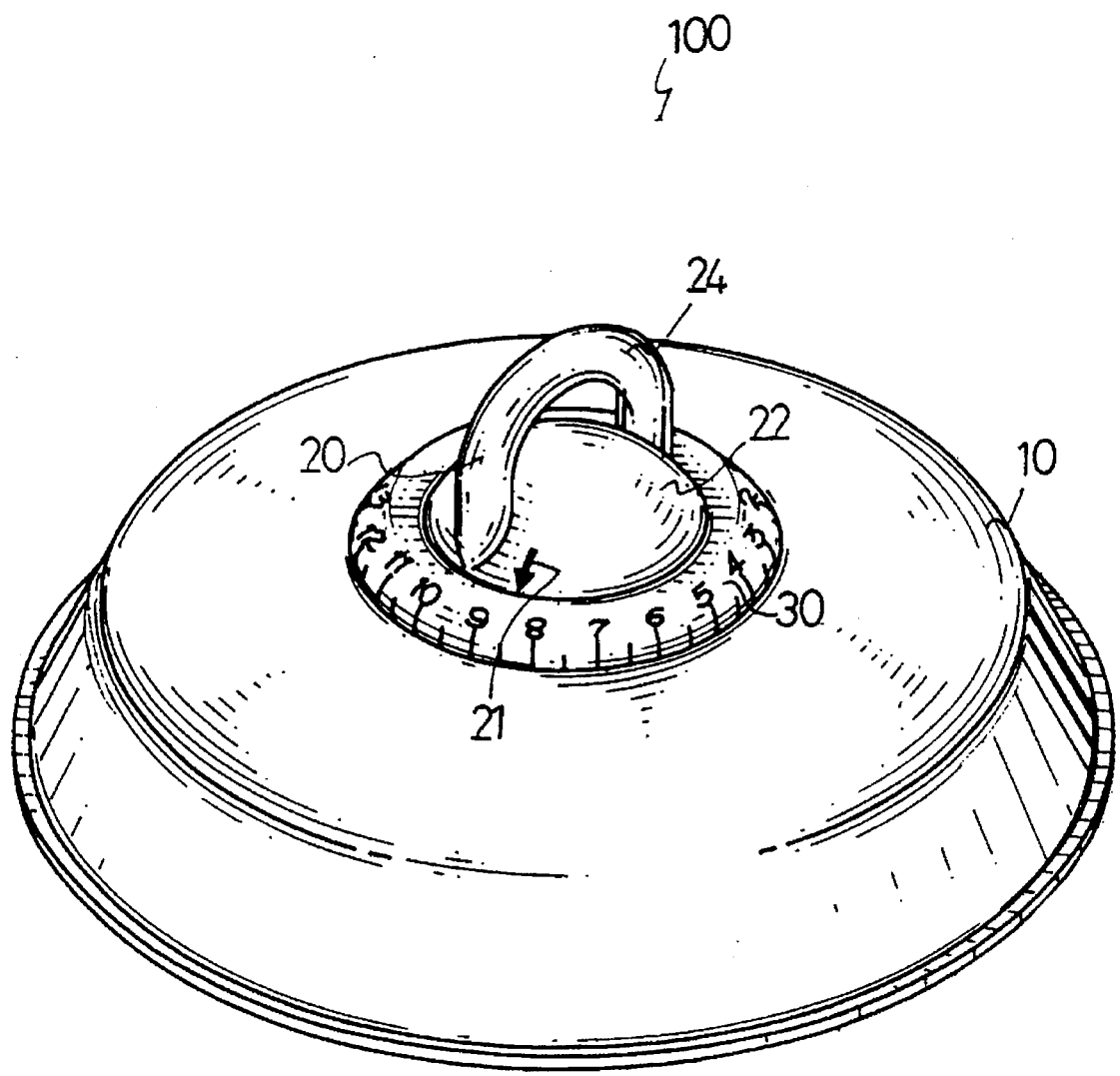
FIG. 1 is a schematic view of a lid with a timer of the present invention.

Referring to FIG. 1, a lid 100 according to the present invention is illustrated. The lid 100 is composed of a body portion 10, a knob 20 secured at a substantial center of the body portion 10 with a pointer mark 21, and a collar 30 with a scale for indicating the time period to be counted. The knob 20 is integrally formed of a domed block 22 with a bottom flange 22' (in FIG. 4) and a U-shaped handle 24.

Figure 2:
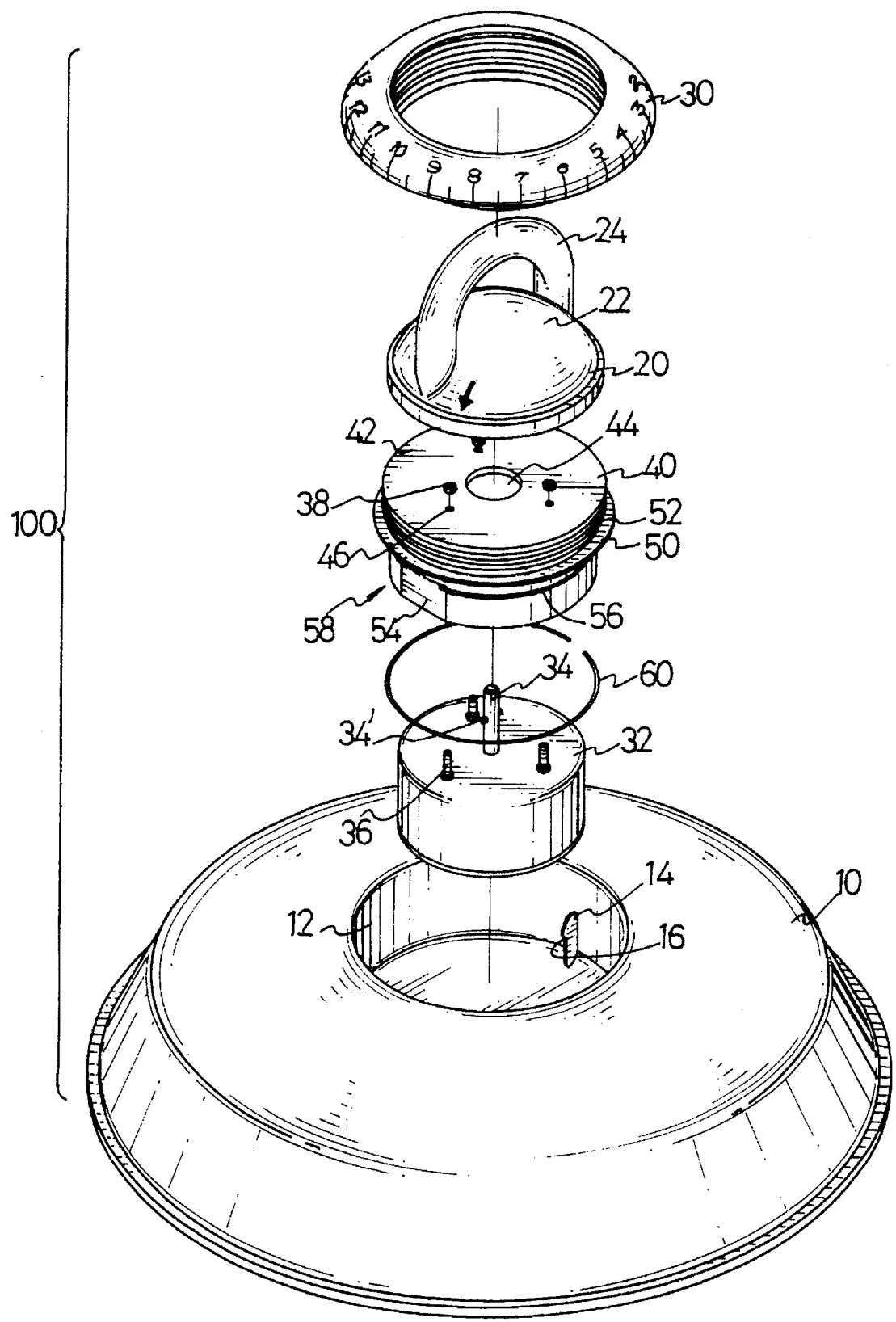
FIG. 2 is a perspective exploded view of a lid with a timer of the present invention.

As shown in FIG. 2, a circular recess 12 is defined in a center of the lid 10 for receiving a timer 32. Two radially-opposite ear portions 14 (only one is shown) protrude from an inner wall of the circular recess 12 and each ear portion 14 has a notch 16. A tubular cap 40 includes a circular plate 42 and a downward extending edge 50. The plate 42 has a central hole 44 and a plurality of apertures 46. The downward extending edge 50 defines a threaded periphery 52, two flats 54 (only one is shown), a circumferential groove 56 in the edge 50, and a cylindrical chamber 58 under the plate 50 for receiving the timer 32.

The timer 32 has an adjusting pole 34 extending through the central hole 44, a corresponding number of screws 36 for extending through the apertures 44, and a corresponding number of nuts 38 threadably engaging with the screws 36 to secure the timer 32 within the tubular cap 40. A radially extended pin 34' is provided on the adjusting pole 34. A 'C'-clip 60 is provided within the groove 56 such that the tubular cap 40 may be secured within the recess 12 by having the 'C'-clip 60 engaged within the notches 16 of the ear portions 14.

Figure 3:
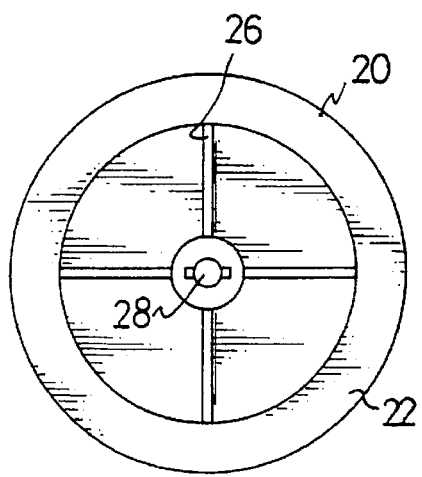
FIG. 3 is a bottom view of the knob of the present invention.

Referring to FIG. 3, the domed block 22 of the knob 20 is supported by a cross-shaped frame 26. A central portion of the frame 26 is provided with a central bore 28 shaped to marginally receive the adjusting pole 34 and the pin 34' of the timer 30.

Figure 4:
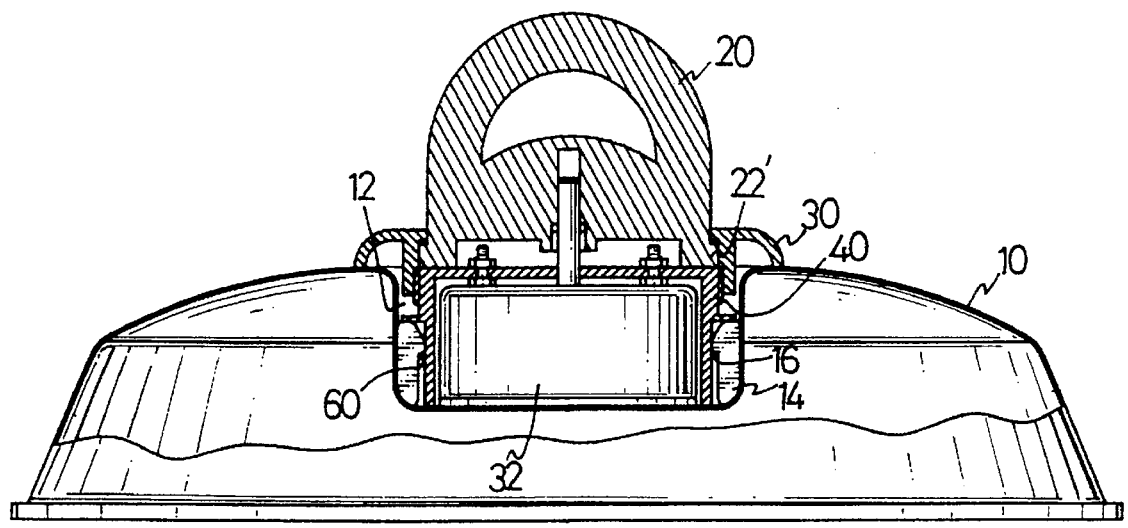
FIG. 4 is a cross-sectional view of the lid in FIG. 1 taken along line 4—4.

Referring back to FIG. 2, when the knob 20 is coupled with the timer 32 by having the pole 34 inserted into the central bore 28, the collar 30 having a threaded inner periphery can be threadably engaged with the threaded periphery 52 of the tubular cap 40 thereby marginally securing the bottom flange 22' of the knob 20 between the collar 30 and the tubular cap 40 as shown in FIG. 4. As shown in FIG. 4, the knob 20 therefore is rotatably mounted on the lid 10 and a user can adjust the timer 32 by rotating the knob 20. The tubular cap 40 is secured within the circular recess 12 by having the 'C'-clip 60 received within the notches 16 of the ear portion 14.

Although the invention has been explained in relation to its preferred embodiment, it is to be understood that many other possible modifications and variations can be made without departing from the spirit and scope of the invention as hereinafter claimed.

I claim:

1. An arrangement for mounting a timer having an adjusting pole and a plurality of screws onto a lid, comprising:

a circular recess defined in a substantial center of the lid;

a plurality of equidistant ear portions protruding from an inner wall of the circular recess and each defining a notch;

a tubular cap having a circular plate with a central hole and a plurality of apertures and a downward extending edge defining a threaded periphery, a plurality of flats facing the ear portions so as to be marginally received within the circular recess, a groove facing the notches of the ear portions, and a cylindrical chamber for receiving the timer by having the adjusting pole extending through the central hole and the screws of the timer extending through the apertures, and a corresponding number of nuts threadably engaging with the screws;

a 'C'-clip received within the groove and biased within the notches as to secure the tubular cap onto the lid;

a knob defining a bottom flange and coupled with the adjusting pole of the timer; and a collar defining a circular bore with a threaded surface for engaging with the threaded periphery of the tubular cap and for the knob to extend therethrough with the bottom flange rotatably secured between the collar and the tubular cap.

2. An arrangement for mounting a timer onto a lid as claimed in claim 1, wherein said adjusting pole of the timer further comprises a radially extending pin.

3. An arrangement for mounting a timer onto a lid as claimed in claim 2, wherein said knob is composed of a domed block and a U-shaped handle and defines a central bore for the adjusting pole to extend therethrough.

* * * * *